(12) United States Patent
Yada

(10) Patent No.: US 12,160,473 B2
(45) Date of Patent: Dec. 3, 2024

(54) MANAGEMENT SYSTEM, MANAGEMENT METHOD, MANAGEMENT PROGRAM, AND INSTALLATION PROGRAM

(71) Applicant: BROTHER KOGYO KABUSHIKI KAISHA, Nagoya (JP)

(72) Inventor: Yuki Yada, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/586,784

(22) Filed: Jan. 28, 2022

(65) Prior Publication Data

US 2022/0247817 A1    Aug. 4, 2022

(30) Foreign Application Priority Data

Jan. 29, 2021   (JP) .................................. 2021-013364

(51) Int. Cl.
*H04L 67/1097*   (2022.01)

(52) U.S. Cl.
CPC ............................... *H04L 67/1097* (2013.01)

(58) Field of Classification Search
CPC .................................................. H04L 67/1097
See application file for complete search history.

(56) References Cited

U.S. PATENT DOCUMENTS

| 8,553,255 | B2* | 10/2013 | Shirai | ................... | G06F 3/1286 |
| | | | | | 358/1.14 |
| 9,223,789 | B1* | 12/2015 | Seigle | ................... | G06F 16/113 |
| 9,661,163 | B1* | 5/2017 | Shin | ................... | H04N 1/00061 |
| 9,934,671 | B1* | 4/2018 | Anderson | .......... | G05B 23/0208 |
| 2010/0005136 | A1* | 1/2010 | Ferlitsch | ................ | H04N 1/444 |
| | | | | | 709/203 |

(Continued)

FOREIGN PATENT DOCUMENTS

| CN | 103825964 A | * | 5/2014 |
| CN | 104978259 A | * | 10/2015 |

(Continued)

OTHER PUBLICATIONS

Japanese Office Action for the related Japanese Patent Application No. 2021-013364 dated Aug. 6, 2024.

*Primary Examiner* — Shean Tokuta
(74) *Attorney, Agent, or Firm* — KENEALY VAIDYA LLP

(57) ABSTRACT

A management system includes a first communication device configured to access a cloud storage, and a second communication device that is configured to access the cloud storage and is communicably connected to a first terminal device or provided in a second terminal device. The first communication device is configured to execute a first writing processing of writing task request data into the cloud storage, and a first acquisition processing of acquiring terminal data from the cloud storage in response to arrival of a first acquisition timing. The second communication device is configured to execute a second acquisition processing of acquiring the task request data from the cloud storage in response to arrival of a second acquisition timing, and a second writing processing of acquiring the terminal data from the management target and write the terminal data into the cloud storage.

13 Claims, 9 Drawing Sheets

(56) References Cited

U.S. PATENT DOCUMENTS

| | | | | |
|---|---|---|---|---|
| 2010/0333116 | A1* | 12/2010 | Prahlad | G06F 3/067 713/153 |
| 2012/0042065 | A1* | 2/2012 | Takahashi | G06F 3/126 709/224 |
| 2014/0207932 | A1* | 7/2014 | Hyo | H04L 63/08 709/223 |
| 2015/0178031 | A1* | 6/2015 | Kanamori | G06F 3/1288 358/1.15 |
| 2015/0356380 | A1 | 12/2015 | Nakata | |
| 2016/0179447 | A1* | 6/2016 | Ochi | G06F 3/1288 358/1.15 |
| 2017/0026549 | A1* | 1/2017 | Masuda | H04N 1/0023 |
| 2017/0090825 | A1* | 3/2017 | Osadchyy | G06F 3/1286 |
| 2017/0257431 | A1* | 9/2017 | Zhao | H04L 67/1029 |
| 2018/0032283 | A1* | 2/2018 | Park | G06F 3/0659 |
| 2018/0097817 | A1* | 4/2018 | Aboubakr | G06F 21/6272 |
| 2019/0068741 | A1* | 2/2019 | Mukai | H04L 67/568 |
| 2019/0068827 | A1* | 2/2019 | Shin | H04N 1/32032 |
| 2019/0089863 | A1* | 3/2019 | Kobayashi | G06V 40/30 |
| 2019/0236516 | A1* | 8/2019 | Ponnusamy | G06Q 10/1091 |
| 2019/0243683 | A1* | 8/2019 | Botelho | G06F 21/44 |
| 2019/0286813 | A1* | 9/2019 | Lounsberry | H04L 9/0894 |
| 2019/0306115 | A1 | 10/2019 | Nishizaki | |
| 2019/0306169 | A1* | 10/2019 | Statia | H04L 63/108 |
| 2020/0125424 | A1* | 4/2020 | Subedi | G06F 9/542 |
| 2020/0125669 | A1* | 4/2020 | Subedi | G06F 16/24578 |
| 2020/0293375 | A1* | 9/2020 | Klein | G06F 3/0631 |
| 2021/0216411 | A1* | 7/2021 | Subramanian | G06F 11/1461 |
| 2022/0247749 | A1* | 8/2022 | Yada | H04L 63/102 |
| 2022/0247817 | A1* | 8/2022 | Yada | H04L 67/1097 |
| 2022/0247876 | A1* | 8/2022 | Sakuragi | H04N 1/00344 |

FOREIGN PATENT DOCUMENTS

| | | | | |
|---|---|---|---|---|
| CN | 106406993 A | * | 2/2017 | G06F 9/4843 |
| CN | 110825505 A | * | 2/2020 | G06F 9/4881 |
| CN | 110990132 A | * | 4/2020 | G06F 9/4881 |
| CN | 111177213 A | * | 5/2020 | G06F 16/2457 |
| CN | 113688173 A | * | 11/2021 | |
| JP | 2006099751 A | * | 4/2006 | G06Q 10/00 |
| JP | 3817429 B2 | * | 9/2006 | G06F 3/1204 |
| JP | 2009-93262 A | | 4/2009 | |
| JP | 2009-134610 A | | 6/2009 | |
| JP | 2008186381 A | * | 8/2014 | |
| JP | 2015-232755 A | | 12/2015 | |
| JP | 2016117186 A | * | 6/2016 | G06F 3/121 |
| JP | 6015850 B2 | * | 10/2016 | G06F 11/1456 |
| JP | 2018056732 A | * | 4/2018 | |
| JP | 2018185869 A | * | 11/2018 | G06F 3/121 |
| JP | 2019-49914 A | | 3/2019 | |
| JP | 2019-148957 A | | 9/2019 | |
| JP | 2019-179446 A | | 10/2019 | |
| JP | 2020035379 A | * | 3/2020 | H04N 1/00344 |
| JP | 2020-198000 A | | 12/2020 | |
| WO | WO-02073393 A1 | * | 9/2002 | H04L 29/06 |

* cited by examiner

FIG. 5A

SCHEDULED TASK TABLE (RESULT)

| PROPERTY | FIRST KEY | SECOND KEY | REQUEST PARAMETER | RESPONSE PARAMETER | NOTIFICATION SOURCE | PROGRESS STATUS | DEVICE ID |
|---|---|---|---|---|---|---|---|
| VALUE | LOG | [DEVICE ID] | | [PROCESSING RESULT: OID/VALUE]※ | DEVICE OR CLIENT | | |
| | STATUS | [DEVICE ID] | | [PROCESSING RESULT: OID/VALUE] | DEVICE OR CLIENT | | |
| | REGISTRATION | [DEVICE ID] | | [PROCESSING RESULT: OID/VALUE] | DEVICE OR CLIENT | REQUEST OR ALREADY REGISTERED | |

※ DATA EXAMPLE

REQUEST PARAMETER (JSON)
{
 "x.x.x.x.x ·········":"",
 "%MIB(x.x.x.x.x ·········)%":"",
 "y.y.y.y ·········":"",
 "%MIB(y.y.y.y ·········)%":"",
 ...
}

EXECUTE PROCESSING 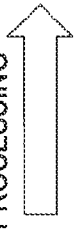

RESPONSE PARAMETER (JSON)
{
 "x.x.x.x.x ·········":"",
 "310104000000013201000001ff":"",
 "y.y.y.y ·········":"4",
 ...
}

FIG. 5B

INSTANT TASK TABLE

| PROPERTY | FIRST KEY | SECOND KEY | REQUEST PARAMETER | RESPONSE PARAMETER | NOTIFICATION SOURCE | PROGRESS STATUS | DEVICE ID |
|---|---|---|---|---|---|---|---|
| VALUE | INSTANT TASK | [TRANSACTION ID] | [PROCESSING CONTENT] | [PROCESSING RESULT] | DEVICE OR CLIENT | REQUEST OR IN PROGRESS OR COMPLETED | [DEVICE ID] |

FIG. 6A

MASTER INITIAL FILE

```
[AzureConnect]
mode=master_bradmin                                      ------ A1
[Azure.Master]
connection.polling.interval=1                            ------ A2
master_name=BRAdmin Master
master_id=AAAAAA
```

FIG. 6B

CLIENT INITIAL FILE (CLIENT PROFILE)

```
[AzureConnect]
mode=edgeclient                                          ------ B1
[Azure.Profile]
active=yes
name=
id=BBBBB
blob.saskey=XXXXXXXXXX                                   ------ B2
table.saskey=XXXXXXXXXXXX                                ------ B3
client_name=BRAdminClient
client_id=CCCCC
connection.log.interval=300                              ------ B4
client.network.interval=5                                ------ B5
client.usb.interval=60                                   ------ B6
connection.polling.interval=1                            ------ B7
```

MANAGEMENT SYSTEM, MANAGEMENT METHOD, MANAGEMENT PROGRAM, AND INSTALLATION PROGRAM

CROSS REFERENCE TO RELATED APPLICATIONS

This application is based on Japanese Patent Applications No. 2021-013364 filed on Jan. 29, 2021, the entire contents of which are incorporated herein by reference.

TECHNICAL FIELD

The present disclosure relates to a technique for managing a terminal device.

BACKGROUND ART

JP-A-2019-148957 discloses a technique for managing an image forming device by a management device via a server.

In the technique disclosed in JP-A-2019-148957, a server for managing an image forming device by a management device actively functions. That is, the server executes various determination processings, and notifies the management device or the image forming device of a processing result.

Therefore, costs of the server are increased, and thus costs required for constructing a system for managing the image forming device by the management device are increased. An object of an aspect of the present disclosure is to provide a management system that can manage a terminal device in a simple and low-cost manner.

SUMMARY

A management system according to an aspect of the present disclosure includes a first communication device and a second communication device. The first communication device can access a cloud storage. The second communication device is communicably connected to a first terminal device, or is provided in a second terminal device. The second communication device can access the cloud storage.

The first communication device executes a first writing processing and a first acquisition processing. The first writing processing is a processing of writing task request data into the cloud storage. The task request data is data for requesting a management target to execute a first task. The management target is the first terminal device connected to the second communication device or the second terminal device provided with the second communication device. That is, for example, when the second communication device is communicably connected to the first terminal device, the management target is the first terminal device. For example, when the second communication device is provided in the second terminal device, the management target is the second terminal device.

The first acquisition processing is a processing of acquiring terminal data from the cloud storage in response to arrival of a first acquisition timing. The terminal data is data included in the management target, is acquired from the management target by the second communication device, and is written into the cloud storage.

The second communication device executes a second acquisition processing and a second writing processing. The second acquisition processing is a processing of acquiring task request data from the cloud storage in response to arrival of a second acquisition timing. The second writing processing is a processing of acquiring terminal data from the management target and writing the acquired terminal data into the cloud storage.

In such a management system, the cloud storage passively functions relative to the first communication device and the second communication device. Each of the first communication device and the second communication device writes necessary data into the cloud storage. Each of the first communication device and the second communication device accesses the cloud storage and reads data. Therefore, the cloud storage can be implemented in a simple and low-cost manner. In other words, the terminal device can be managed using a simple and low-cost cloud storage. Therefore, the terminal device can be managed in a simple and low-cost manner.

According to another aspect of the present disclosure, there is provided an installation program. The installation program installs a program in a computer. The program causes the computer to function as the first communication device or the second communication device (specifically, the second communication device communicably connected to the first terminal device).

Specifically, the installation program causes the computer to execute a function information acquisition processing and an installation processing. The function information acquisition processing is a processing of acquiring function information indicating which one of the first communication device and the second communication device is to function. In the installation processing, the program for causing the computer to function as the first communication device or the second communication device indicated by the function information acquired in the function information acquisition processing is installed in the computer.

According to such an installation program, the computer can alternatively function as the first communication device or the second communication device in accordance with the function information. According to another aspect of the present disclosure, there may be provided a first communication device or a second communication device that constitutes the management system. According to another aspect of the present disclosure, there may be provided a program for causing a computer to function as a first communication device and a program for causing a computer to function as a second communication device. According to another aspect of the present disclosure, there may be provided a method for managing each terminal device. The method is used in the management system and is used to manage each terminal device by a first communication device via a cloud storage and a second communication device.

BRIEF DESCRIPTION OF DRAWINGS

FIG. 5A is a diagram showing an example of a scheduled task table, and FIG. 5B is a diagram showing an example of an instant task table.

FIG. 6A is a diagram showing an example of a master initial file, and FIG. 6B is a diagram showing an example of a client initial file.

DETAILED DESCRIPTION OF EMBODIMENTS

Figure 1:
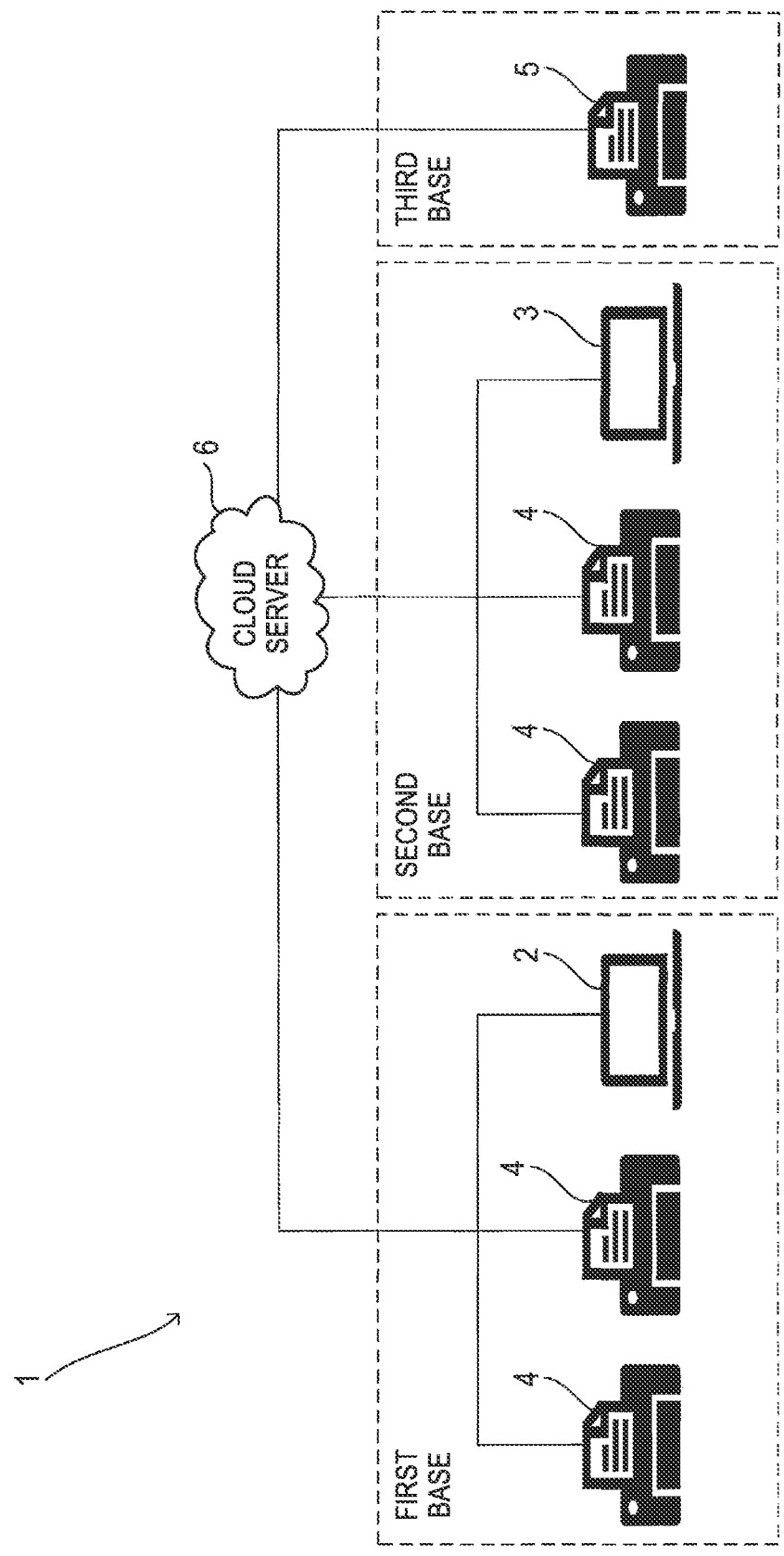
FIG. 1 is a configuration diagram showing a management system according to an embodiment.

Hereinafter, exemplary embodiments of the present disclosure will be described with reference to the drawings.

1. Embodiment (1-1) Overall Configuration

A management system 1 according to an embodiment of the present disclosure is a network system configured to manage terminal devices 4 and 5 arranged in a plurality of bases via a cloud server 6, in cooperation with a master 2 and a client 3.

The master 2 shown in FIG. 1 can communicate, via a local area network, with the terminal device 4 installed in a first base. Further, the master 2 can communicate with the cloud server 6 via a wide area network. A plurality of terminal devices 4 may be provided in the first base.

The client 3 can communicate, via a local area network, with the terminal device 4 installed in a second base. Further, the client 3 can communicate with the cloud server 6 via a wide area network. A plurality of terminal devices 4 may be provided in the second base.

The terminal device 5 installed in a third base can communicate with the cloud server 6 via a wide area network.

The local area network may include, for example, at least one of a wireless LAN and a wired LAN. The wide area network may include, for example, the Internet. A local area network may be constructed in the third base. In this case, the terminal device 5 may be connected to a wide area network via the local area network in the third base.

The terminal device 4 cannot use a cloud service provided by the cloud server 6. In other words, each terminal device 4 does not have a function of communicating with the cloud server 6. Hereinafter, the terminal device 4 is particularly referred to as a first type terminal device 4. On the other hand, the terminal device 5 is a terminal device that can use a cloud service provided by the cloud server 6. In other words, the terminal device 5 has a function of communicating with the cloud server 6. Such a function of the terminal device 5 is implemented by a communication program 82*a* (see FIG. 3A) to be described later. Hereinafter, the terminal device 5 is particularly referred to as a second type terminal device 5.

The first type terminal device 4 installed in the second base is managed by the master 2 via the client 3 and the cloud server 6. The second type terminal device 5 installed in the third base is managed by the master 2 via the cloud server 6 but not via the client 3.

The terminal devices 4 and 5 managed by the master 2 may be, for example, a group of terminal devices managed by an organization such as a company. In this case, each base may be an activity base of an organization. For example, the first base where the master 2 is present may be an office of an organization management department. The other second and third bases may be branch offices of organizations separated from the first base.

Examples of the terminal devices 4 and 5 include a printer, a scanner, and a digital multifunction device in which these functions are integrated. The master 2 and the client 3 are implemented, for example, by installing a dedicated computer program in an information processing device (for example, a personal computer).

(1-2) Device Configuration

Figure 2A:
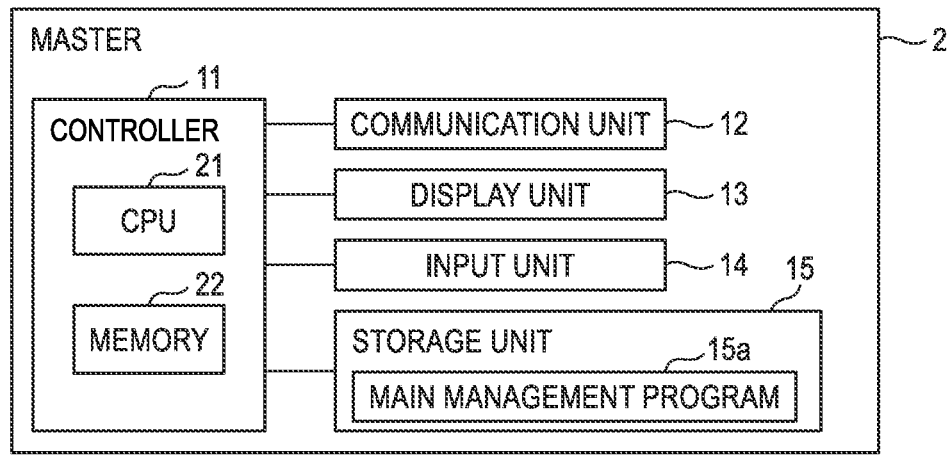
FIG. 2A is a block diagram showing a master.

The master 2 shown in FIG. 2A includes a controller 11, a communication unit 12, a display unit 13, an input unit 14, and a storage unit 15. The controller 11 includes a CPU 21 and a memory 22. The CPU 21 serving as a processor executes a processing according to a computer program stored in the storage unit 15. The memory 22 is used as a work memory when the above processing is executed.

The storage unit 15 includes, for example, a storage such as a solid state drive (SSD) and a hard disk drive (HDD), and stores various computer programs and data. The storage unit 15 stores a main management program 15*a*. The main management program 15*a* is a computer program for causing the CPU 21 to implement a management function to be implemented by the master 2. It may be understood that a processing mainly executed by the controller 11 is achieved by a processing executed by the CPU 21 in accordance with a computer program in the following description.

The communication unit 12 is connected to a local area network in a base where the master 2 is present, and is further connected to a wide area network. The communication unit 12 may be connected to a wide area network via a router (not shown). The display unit 13 is configured to display various screens for a user who operates the master 2. An example of the display unit 13 includes a liquid crystal display. Examples of the various screens include a screen for displaying log information and status information of the terminal devices 4 and 5 to be managed, and a screen for remotely operating the terminal devices 4 and 5 in accordance with an operation signal from the user.

The input unit 14 includes one or more input devices for inputting an operation signal from the user who operates the master 2, such as a keyboard and a pointing device. The controller 11 operates in accordance with an operation signal input via the input unit 14.

Figure 2B:
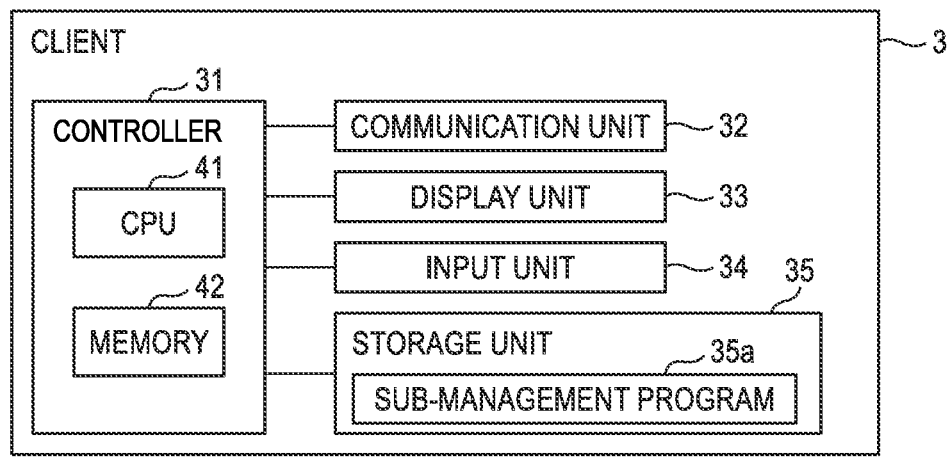
FIG. 2B is a block diagram showing a client.

The client 3 shown in FIG. 2B includes a controller 31, a communication unit 32, a display unit 33, an input unit 34, and a storage unit 35. The controller 31 includes a CPU 41 and a memory 42. The CPU 41 serving as a processor executes a processing according to a computer program stored in the storage unit 35.

The storage unit 35 stores a sub-management program 35*a*. The sub-management program 35*a* is a computer program for causing the CPU 41 to implement a management relay function to be implemented by the client 3. It may be understood that a processing mainly executed by the controller 31 is achieved by a processing executed by the CPU 41 in accordance with a computer program in the following description.

The management relay function is a function related to a management function of the master 2, and relays (or mediates) the management of the first type terminal device 4 managed by the master 2. The master 2 manages the first type terminal device 4 in a base different from a base where the master 2 is present, by using the management relay function of the client 3 provided in the base different from the base where the master 2 is present. That is, the first type terminal device 4 (for example, each of the two first type terminal devices 4 in the second base in the example shown in FIG. 1) connected to the same local area network as the client 3 is indirectly managed by the master 2 via the mediation of the client 3 by the management relay function of the client 3. The first type terminal device 4 connected to the same local area network as the client 3, that is, the first type terminal device 4 that is an execution target of the management relay function of the client 3, is referred to as a "management relay target".

The communication unit 32 is connected to a local area network in a base where the client 3 is present, and is further connected to a wide area network. The communication unit 32 may be connected to a wide area network via a router (not shown). The display unit 33 includes, for example, a liquid crystal display, and is configured to display various screens for a user who operates the client 3. The input unit 34 includes one or more input devices for inputting an operation signal from a user who operates the client 3. The controller 31 operates in accordance with an operation signal input via the input unit 34.

Figure 2C:
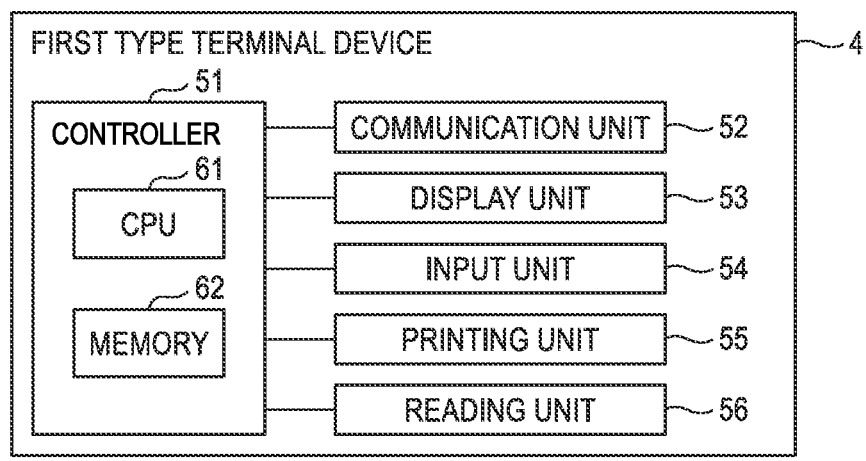
FIG. 2C is a block diagram showing a first type terminal device.

The first type terminal device 4 shown in FIG. 2C includes a controller 51, a communication unit 52, a display unit 53, and an input unit 54. When the first type terminal device 4 is a digital multifunction device, the first type terminal device 4 may further include a printing unit 55 and a reading unit 56. The first type terminal device 4 may include only one of the printing unit 55 and the reading unit 56.

The controller 51 includes a CPU 61 and a memory 62. The memory 62 may include a nonvolatile memory such as a flash memory in addition to a RAM, and can store a computer program, setting data, and the like in the nonvolatile memory.

The CPU 61 serving as a processor executes overall control of the entire first type terminal device by executing a processing according to a computer program stored in the memory 62. It may be understood that a processing mainly executed by the controller 51 is achieved by a processing executed by the CPU 61 in accordance with a computer program in the following description.

The communication unit 52 is connected to a local area network in a base where the first type terminal device 4 is present, so that the communication unit 52 can communicate with the master 2 or the client 3 present in the local area network. The display unit 53 includes, for example, a liquid crystal display, and is configured to display various screens for a user who operates the first type terminal device 4. The input unit 54 includes one or more input devices such as a touch panel on a liquid crystal display in order to input an operation signal from a user.

The printing unit 55 is configured to print an image on a sheet under the control of the controller 51. Examples of the printing unit 55 include an inkjet printer and a laser printer. According to the present embodiment, status information such as a remaining amount of a color material and log information such as the number of printed sheets are provided from the first type terminal device 4 to the master 2 via the client 3 and the cloud server 6 by a method to be described later. The reading unit 56 is configured to read a reading target such as a printed matter under the control of the controller 51.

Figure 3A:
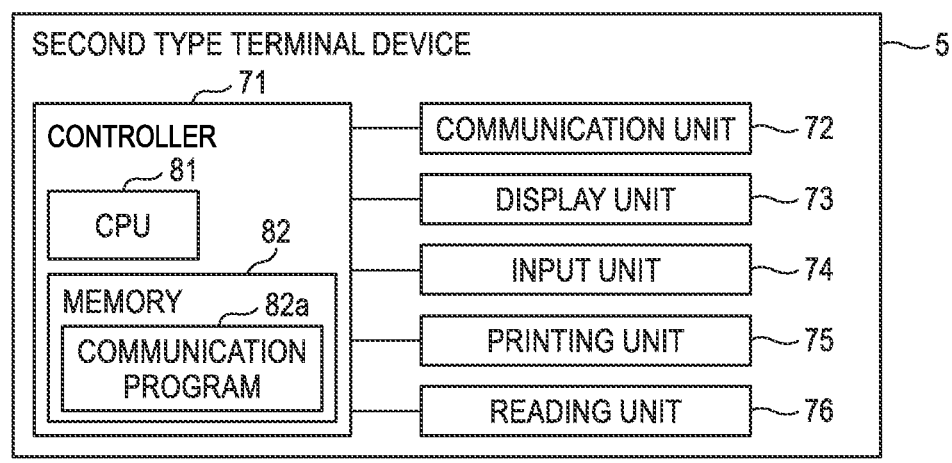
FIG. 3A is a block diagram showing a second type terminal device.

The second type terminal device 5 shown in FIG. 3A includes a controller 71, a communication unit 72, a display unit 73, and an input unit 74. When the second type terminal device 5 is a digital multifunction device, the second type terminal device 5 may further include a printing unit 75 and a reading unit 76. The second type terminal device 5 may include only one of the printing unit 75 and the reading unit 76.

The controller 71 includes a CPU 81 and a memory 82. The memory 82 may include a nonvolatile memory such as a flash memory, and can store a computer program, setting data, and the like in the nonvolatile memory.

The CPU 81 serving as a processor executes overall control of the entire device by executing a processing in accordance with a computer program stored in the memory 82. The memory 82 stores a communication program 82a. The communication program 82a is a program for using a cloud service provided by the cloud server 6. It may be understood that a processing mainly executed by the controller 71 is achieved by a processing executed by the CPU 81 in accordance with a computer program in the following description.

The communication unit 72 is connected to a wide area network, so that the communication unit 72 can communicate with the cloud server 6. When a local area network is constructed in the third base, the communication unit 72 may be connected to a wide area network via the local area network. The display unit 73 includes, for example, a liquid crystal display. The input unit 74 includes one or more input devices for inputting an operation signal from a user.

The printing unit 75 is configured to print an image on a sheet under the control of the controller 71. According to the present embodiment, status information such as a remaining amount of a color material and log information such as the number of printed sheets are provided from the second type terminal device 5 to the master 2 via the cloud server 6 by a method to be described later. The reading unit 76 is configured to read a reading target such as a printed matter under the control of the controller 71.

Figure 3B:
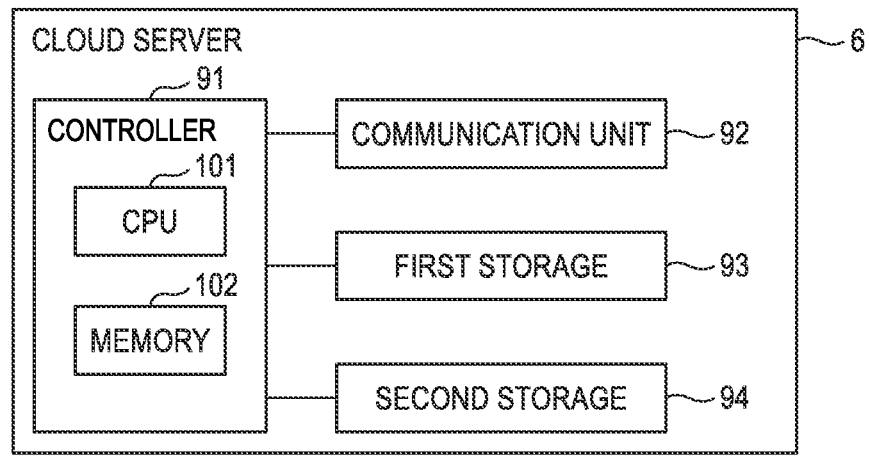
FIG. 3B is a block diagram showing a cloud server.

The cloud server 6 shown in FIG. 3B includes a controller 91, a communication unit 92, a first storage 93, and a second storage 94. The controller 91 includes a CPU 101 and a memory 102.

The CPU 101 serving as a processor executes a processing in accordance with a computer program stored in the memory 102. A processing executed by the CPU 101 includes a processing for causing the cloud server 6 to function as a cloud storage. It may be understood that a processing mainly executed by the controller 91 is achieved by a processing executed by the CPU 101 in accordance with a computer program in the following description.

The cloud storage includes a table storage and an object storage. The controller 91 executes the processing described above, so that the first storage 93 functions as a table storage and the second storage 94 functions as an object storage.

The first storage 93 in the example functions as a NoSQL data store, and can store various tables (for example, see FIGS. 5A and 5B to be described later) having a group of schema-less entities as constituent elements. That is, the first storage 93 is a type of database, and the database is written into the first storage 93.

In the first storage 93, each entity in the table includes a set of properties. Each property includes a pair of a key and a value. For example, the master 2, the client 3, and the second type terminal device 5 can access desired data in a table in the first storage 93 to read the data or update the desired data in the table by designating an entity and a key.

The entity can be considered as a matter similar to a position of a record in a relational database. The property can be considered as a matter similar to a position of a column (or field) in a relational database. The key in the property can be considered as a matter similar to a position of an item name (or head) in a relational database. The value can be considered as a matter similar to a position of a field in a relational database.

The second storage 94 in the example functions as an object storage in which an object can be read and written from the outside. The object includes, for example, any text file and/or a binary file. That is, it can be said that the second storage 94 is a file storage that stores a file. Reading an object from the second storage 94 and writing an object into the second storage 94 are executed using, for example, an HTTP/HTTPS protocol. For example, the master 2, the client 3, and the second type terminal device 5 can access (for example, read) a desired file stored in the second storage 94 by designating a file name and a path.

Azure (registered trademark) of Microsoft Corporation is known as a cloud service providing the table storage and the object storage described above. The cloud server 6 can operate in the same manner as such a cloud service. For example, the first storage 93 may be an Azure Table Storage in Azure, and the second storage 94 may be an Azure Blob Storage in Azure.

(1-3) Sequence Outline

Figure 4A:
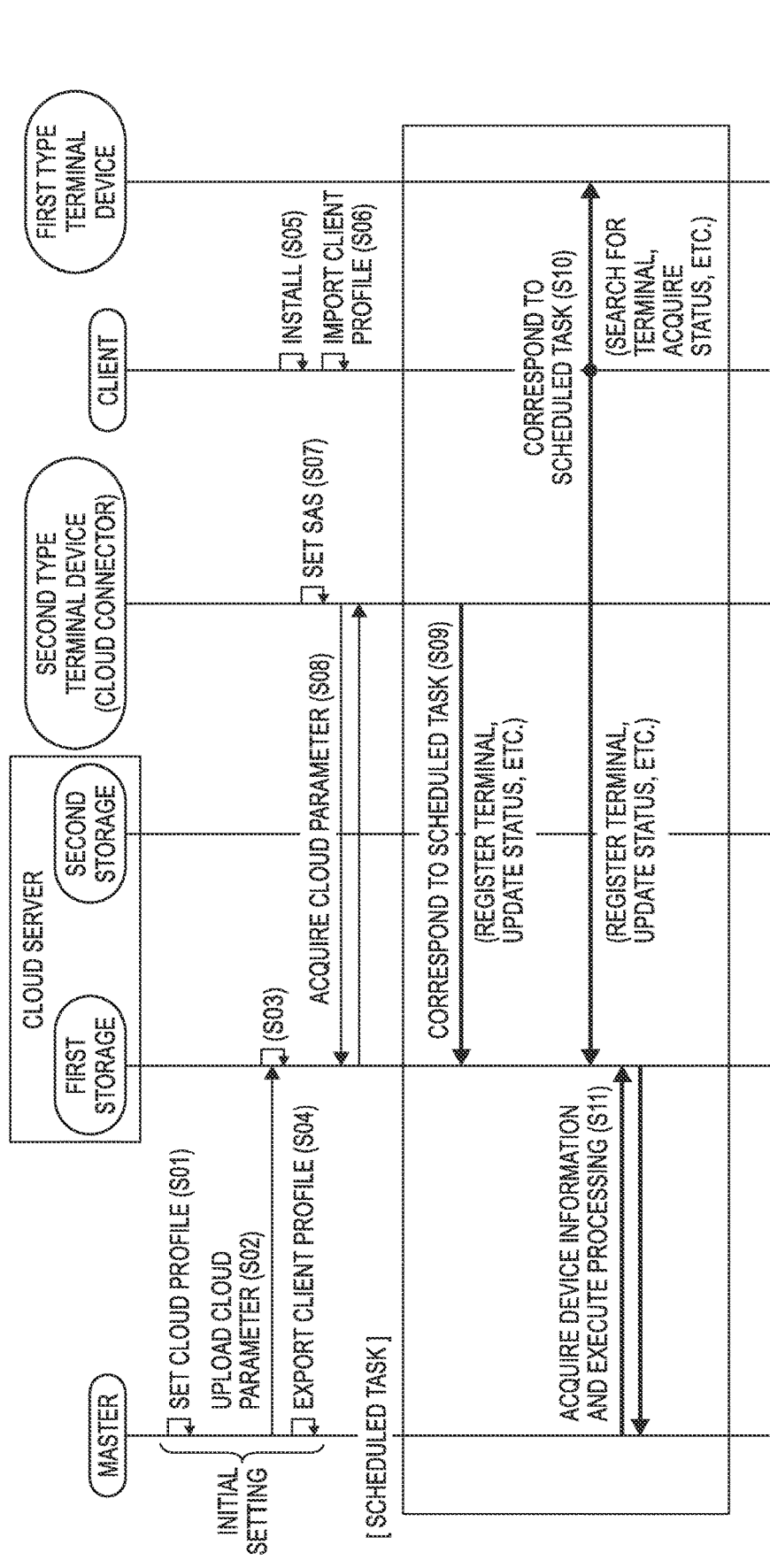
FIGS. 4A and 4B show a diagram of an example of a management sequence executed by the management system.

Next, an operation sequence related to a management will be schematically described with reference to FIGS. 4A and 4B. In a preparation stage, the main management program 15a is installed in the master 2 by an installer. An installer of the main management program 15a and an installer of the sub-management program 35a may be prepared separately from each other. In the present embodiment, one common installer (hereinafter, referred to as a "common installer". The common installer correspond to an example of an installation program in the present disclosure.) selectively installs one of the main management program 15a and the sub-management program 35a. After the common installer is activated, the common installer refers to an initial file and determines which one of the main management program 15a and the sub-management program 35a is to be installed.

For example, there are two types of initial files. Specifically, there may be a master initial file corresponding to the main management program 15a and a client initial file corresponding to the sub-management program 35a. An example of the master initial file is shown in FIG. 6A. An example of the client initial file is shown in FIG. 6B.

The master initial file may be generated anywhere and in any manner. For example, the master initial file may be generated by a text editor or the like in accordance with an input operation executed on the input unit 14 of the master 2 by a main administrator who is a user of the master 2.

In the present embodiment, the client initial file is automatically generated based on the main management program 15a, which will be described later. The client initial file may also be generated in accordance with an input operation by a user in a similar manner to the master initial file.

In the master initial file shown in FIG. 6A, a reference numeral A1 indicates an operation mode. The operation mode defines whether an initial file is a master file or a client file. In other words, the operation mode defines which one of the main management program 15a and the sub-management program 35a is to be installed in accordance with the initial file. In the example shown in FIG. 6A, the operation mode indicates a master operation mode. The operation mode corresponds to an example of function information in the present disclosure. In the client initial file, an operation mode is set as indicated by a reference numeral B1 in FIG. 6B. In FIG. 6B, the operation mode indicates a client operation mode.

A reference numeral A2 indicates a first polling cycle. FIG. 6A shows an example in which the first polling cycle is, for example, one minute. The first polling cycle is used as a cycle when the master 2 confirms an execution status of an instant task by polling after a request for the instant task to be described later (see S18, S23, and S24 in FIGS. 4A and 4B). The first polling cycle corresponds to an example of a first acquisition timing in the present disclosure.

In order to install the main management program 15a by using the common installer, the common installer can refer to the master initial file at the time of executing an installation processing. For example, the common installer may be activated in a state in which the common installer and the master initial file are stored in the same folder. Accordingly, after the common installer is activated, the common installer proceeds with the installation processing while referring to the master initial file in the same folder.

The installation processing executed by the common installer will be described with reference to FIG. 7. In the master 2 in which the common installer is stored in the storage unit 15, for example, when the controller 11 receives an execution instruction of the common installer from an input operation by the main administrator, the controller 11 starts the installation processing in accordance with the common installer.

When the installation processing is started, the controller 11 acquires an initial file in S110. An operation mode set in the initial file acquired in S110 is determined in S120. Specifically, it is determined whether the operation mode is for a master operation mode or a client operation mode.

When the operation mode indicates a master operation mode, the processing proceeds to S130. The fact that the operation mode indicates a master operation mode refers to that the initial file is a master initial file. Therefore, the main management program 15a is installed using the master initial file in S130.

In S120, when the operation mode indicates a client operation mode, the processing proceeds to S140. The fact that the operation mode indicates a client operation mode refers to that the initial file is a client initial file. Therefore, the sub-management program 35a is installed using the client initial file in S140.

When the main management program 15a is installed in the master 2, a processing in accordance with the main management program 15a is executed by the controller 11 of the master 2. That is, the master 2 has a management function.

The processing in accordance with the main management program 15a includes a processing of setting a cloud profile (S01). For example, the setting of the cloud profile (S01) is executed in accordance with a setting operation executed by the main administrator via the input unit 14.

The setting of the cloud profile (S01) includes setting of a cloud parameter. The cloud parameter includes an initial setting parameter. In the client 3 and the second type terminal device 5, a polling operation for the cloud server 6 and an update operation of information stored in the cloud server 6 are executed, which will be described later. The polling operation is an operation of periodically checking the presence or absence of an instant task to be described later. The information update operation is included in a scheduled task to be described later.

The initial setting parameter includes, for example, a polling operation cycle (hereinafter, referred to as a "second polling cycle") and an information update operation cycle (hereinafter, referred to as an "information update cycle"). The second polling cycle corresponds to an example of a second acquisition timing in the present disclosure. For example, the second polling cycle is one minute as shown by a reference numeral B7 in FIG. 6B in the present embodiment. A plurality of types of information update cycles may be set according to types of information to be updated. For example, three types indicated by reference numerals B4, B5, and B6 in FIG. 6B are set as the information update cycle in the present embodiment.

The cloud parameter may further include a scheduled task template. The scheduled task template defines what kind of processing is to be specifically executed by each of the terminal devices 4 and 5 as a scheduled task to be described later. The information update cycle described above corresponds to an execution cycle of one or more processings (tasks) in the scheduled task. The scheduled task template may be a table in the same format as a scheduled task table (see FIG. 5A) to be described later, and may indicate initial setting data of the scheduled task table. The scheduled task template corresponds to an example of designation information in the present disclosure.

The scheduled task template and the scheduled task table are present individually. That is, in the first storage 93, the scheduled task template is written into a first storage area, and the scheduled task table is written into a second storage area different from the first storage area.

The setting of the cloud profile (S01) further includes setting a shared access signature (SAS) for using the cloud service.

The SAS is individually set for each of the first storage 93 and the second storage 94, that is, for each of the table storage and the object storage. In the setting of the cloud profile in the master 2 (S01), the main administrator sets the SAS to be set in each of the first storage 93 and the second storage 94 as a part of the cloud profile so that the master 2 can access the first storage 93 and the second storage 94.

The same SAS is also set when the main management program 15a is installed in the master 2. When the master 2 accesses the cloud server 6, the SAS set in the master 2 is transmitted to the cloud server 6. When the transmitted SAS matches the SAS of an access destination set in the cloud server 6, communication (reading and writing of data) with the access destination is enabled.

Subsequently, in accordance with an operation of the main administrator, the cloud parameter in accordance with the set cloud profile is uploaded from the master 2 to the first storage 93 of the cloud server 6 (S02), and is written into the first storage 93 (S03). The initial setting parameter including the second polling cycle and the information update cycle is written into the first storage 93 as entities of a table. Each processing in the scheduled task template is also written into the first storage 93 as an entity of the table.

Further, at least a part of the cloud profile is exported from the master 2 as a client profile, that is, data to be read by the client 3 (S04). The client profile corresponds to the client initial file described above as shown in FIG. 6B. For example, the client profile may include at least one of the initial setting parameter, the scheduled task template, and the SAS described above. For example, the client profile may include at least the SAS. The client profile corresponds to an example of a profile in the present disclosure.

In the client profile shown in FIG. 6B, a reference numeral B2 indicates an SAS for accessing the second storage 94, and a reference numeral B3 indicates an SAS for accessing the first storage 93. The reference numerals B4 to B7 are as described above. The reference numeral B1 indicates an operation mode.

That is, an operation mode is also set in the client profile in a similar manner to the master initial file. The operation mode is set to the client initial file in the client profile as shown by the reference numeral B1 in FIG. 6B.

The client profile exported by the master 2 is provided to the client 3. The client profile may be provided to the client 3 by any method. For example, the client profile may be transmitted from the master 2 to the client 3 by e-mail or another method. For example, the client profile may be provided to a sub-administrator who is a user of the client 3 by the main administrator. More specifically, for example, the main administrator may store the client profile in an information processing terminal owned by the main administrator and transmit the client profile to another information processing terminal owned by the sub-administrator, so that the sub-administrator can transfer the client profile from the another information processing terminal to the client 3. The main administrator may transmit the client profile from the information processing terminal of the main administrator to the client 3. For example, the main administrator may store the client profile in a predetermined storage and provide the storage to the sub-administrator, so that the sub-administrator can transfer the client profile from the storage to the client 3.

The sub-administrator operates the client 3, activates the common installer, and installs the sub-management program 35a in the client 3 (S05). In order to install the sub-management program 35a using the common installer, the client profile exported by the master 2 is imported to the common installer at the time of executing an installation processing (S06). For example, the common installer may be activated in a state in which the common installer and the client profile are stored in the same folder in the client 3.

Accordingly, after the common installer is activated, the common installer advances the installation processing while importing the client profile in the same folder (S05 and S06). At this time, the common installer determines that the sub-management program 35a is to be installed in accordance with the fact that the operation mode indicates the client initial file, and installs the sub-management program 35a.

The common installer imports the client profile in the installation of the sub-management program 35a. That is, various kinds of data set in the client profile are appropriately set in the client 3. For example, the SAS, the second polling cycle, the information update cycle, and the like set in the client profile are imported and set in the client 3. The scheduled task template described above may be imported.

When the sub-management program 35a is installed and the client profile is set as described above, the client 3 can use the cloud server 6. Accordingly, the client 3 can transmit information to the master 2 via the cloud server 6. Specifically, the client 3 can execute, via the cloud server 6, the management relay function described above, that is, a relay operation between the master 2 and the first type terminal device 4, such as an execution instruction of a task from the master 2 to the first type terminal device 4 and transmission of log information and status information from the first type terminal device 4 to the master 2.

On the other hand, the SAS is registered in the second type terminal device 5 by an input operation of a device administrator who is an administrator of the second type terminal device 5 (S07). The registration of the SAS in the second type terminal device 5 may be executed, for example, via the input unit 74 of the second type terminal device 5. For example, the SAS may be registered in the second type terminal device 5 from an information processing device different from the second type terminal device 5. Specifically, a predetermined WEB server may be built in the second type terminal device 5. Then, the SAS may be registered in the second type terminal device 5 by accessing the WEB server from the information processing device different from the second type terminal device 5, inputting the SAS via a user interface in the information processing device, and transmitting the SAS to the WEB server.

The controller 71 of the second type terminal device 5 in which the SAS is registered executes a processing in accordance with the communication program 82a. The controller 71 that executes a processing in accordance with the communication program 82a is hereinafter referred to as a "cloud connector". The cloud connector accesses the first storage 93 of the cloud server 6 using the SAS, and refers to a cloud parameter written by the master 2 (S08). The cloud connector acquires the cloud parameter and sets the cloud parameter in an own device (S08).

When the cloud connector accesses the cloud server 6, the SAS of an access destination set in the cloud connector is transmitted to the cloud server 6. When the transmitted SAS matches the SAS of an access destination set in the cloud server 6, communication (reading and writing of data) with the access destination is enabled.

When the initial setting (S05 to S08) of the client 3 and the second type terminal device 5 (cloud connector) including the setting of the cloud parameter and the SAS described above is completed, the client 3 and the second type terminal device 5 periodically execute a scheduled task of updating information stored in the first storage 93 of the cloud server 6 according to the set information update cycle (S09 and S10). The scheduled task corresponds to an example of a second task in the present disclosure.

When corresponding device information is not registered in the first storage 93, first, the scheduled task (S09) to be executed by the cloud connector starts from registering the device information in the first storage 93. The device information corresponding to the cloud connector is predetermined information indicating the second type terminal device 5 on which the cloud connector is mounted.

When there is a first type terminal device 4 in which corresponding device information is not registered in the first storage 93 among the first type terminal devices 4 to be managed, the scheduled task (S10) to be executed by the client 3 starts from registering the device information of the first type terminal device 4 in the first storage 93. The device information of the first type terminal device 4 is predetermined information indicating the first type terminal device 4.

The first storage 93 includes a scheduled task table as shown in FIG. 5A serving as one table. The scheduled task table includes a group of one or more entities. One entity includes a plurality of properties. In the present embodiment, for example, the plurality of properties include a first key, a second key, a request parameter, a response parameter, a notification source, a progress status, and a device ID, as shown in FIG. 5A.

The scheduled task table includes three entities related to "log", "status", and "registration" for each of the terminal devices 4 and 5. That is, in the present embodiment, there is an individual scheduled task table (hereinafter, referred to as an "individual table") for each of the terminal devices 4 and 5 to be managed, and the scheduled task table can be regarded as an aggregation of these individual tables. Each individual table includes three entities related to "log", "status", and "registration" of a corresponding terminal device.

When the corresponding terminal device is the first type terminal device 4, information in the entity is updated by the client 3 that manages the first type terminal device 4 (S10). When the corresponding terminal device is the second type terminal device 5, information in the entity is updated by the cloud connector of the second type terminal device 5 (S09).

In the scheduled task table shown in FIG. 5A, the property of the "notification source" in the entity indicates an updater of the entity. When the entity is updated by the client 3, the property of the "notification source" in the entity is updated to a value "client". When the entity is updated by the cloud connector, the property of the "notification source" in the entity is updated to a value "device".

The entity related to "log" is a log entity having a value "log" in the first key, and log information of a terminal device to be managed corresponding to the device ID described as a value in the second key is described in the response parameter. The device ID is an ID unique to each of the terminal devices 4 and 5.

When the corresponding terminal device is a printer or a digital multifunction device, the log information may include information about the total number of printed sheets of the corresponding terminal device. The log information may include, as a print history, information about a user of a print command source and the number of printed sheets for each print job. There may be a plurality of types of log information to be managed, and there may be a plurality of log entities respectively corresponding to the plurality of types of log information (corresponding to an example of terminal data of a designated type in the present disclosure).

As shown in FIG. 5A, the response parameter may include, for example, JSON data. For example, the log information may be described in a JSON format by associating an object identifier (OID) used in a management information base (MIB) of a corresponding parameter with a value of the object identifier. The description "x.x.x.x.x . . . ", "y.y.y.y.y . . . " in a lower part of FIG. 5A is an abstract representation showing an example of the object identifier.

The response parameter in an initial state before being updated may be present as a request parameter in which an initial value is associated with the object identifier. According to the example shown in FIG. 5A, OIDs "y.y.y.y.y . . . " and initial values "% MIB (y.y.y.y.y . . . )%" may be present as the request parameter. The log information indicated by the request parameter is actually acquired from a management target and is described as a value of the response parameter in the table. The value of the response parameter is updated every time a scheduled task is executed. The lower part of FIG. 5A shows an example in which, for example, the predetermined log information is updated from an initial value described in the request parameter to a value "4" and is described as a value of the response parameter.

For each of the "status" and "registration" in the first key, an initial value is set in the request parameter, and an actual value corresponding to the initial value is written into the response parameter in a similar manner to the "log".

The entity related to the "status" is a status entity having a value "status" in the first key, and describes, in the response parameter, the status information of a terminal device to be managed corresponding to the device ID described as a value in the second key.

When the corresponding terminal device is a printer or a digital multifunction device, the status information may include information about a remaining amount of a color material of the corresponding terminal device and error information such as a paper jam. There may be a plurality of types of status information to be managed, and there may be a plurality of status entities respectively corresponding to the plurality of types of status information (corresponding to an example of terminal data of a designated type in the present disclosure). Similar to the log entity, the response parameter can be described in a JSON format in the status entity.

The entity related to "registration" is a registration entity having a value "registration" in the first key, and the device information of a terminal device to be managed corresponding to the device ID described as a value in the second key is described in the response parameter. A plurality of item values for explaining a basic configuration of the device are described as the device information in the response parameter.

In the scheduled task table, the entity of the cloud connector of the second type terminal device 5 is updated by the cloud connector (S09). The entity of the first type terminal device 4 is updated by the client 3 connected to the same local area network as the first type terminal device 4 (S10). That is, the client 3 updates the entity of each of the first type terminal devices 4 subordinate to the client 3 (that is, the first type terminal device 4 that is a management relay target). In the registration entity of the first type terminal device 4, identification information of the client 3 whose management relay target is the first type terminal device 4 may be written as a part of the device information.

The client 3 communicates with the first type terminal devices 4 that are the management relay targets in the same local area by a processing of the controller 31 in accordance with the sub-management program 35a, and acquires information necessary for updating the device information from the first type terminal devices 4. The client 3 can update the registration entity of the corresponding first type terminal device 4 in the scheduled task table based on the acquired information (S10).

Further, the client 3 periodically communicates with the first type terminal devices 4 that are the management relay targets in the local area, and acquires corresponding log information and status information. The client 3 can update the log entity and the status entity of the corresponding first type terminal device 4 in the scheduled task table in the first storage 93 of the cloud server 6 based on the acquired log information and status information (S10).

The cloud connector of the second type terminal device 5 can periodically access the cloud server 6 and update the log entity and status entity of the second type terminal device 5 in the first storage 93 so as to update the log information and the status information of the second type terminal device 5 (S09).

The master 2 also functions as the client 3. That is, it may be understood that the master 2 functions as the client 3 for the first type terminal device 4 in the first base. Specifically, in the scheduled task table in the first storage 93 of the cloud server 6, three entities related to "log". "status", and "registration" are generated corresponding to each of the first type terminal devices 4 (hereinafter, referred to as "master subordinate terminal device") in the first base. Similar to the client 3, the master 2 can acquire various kinds of information from the master subordinate terminal device and update the registration entity, the log entity, and the status entity of each corresponding master subordinate terminal device in the scheduled task table of the first storage 93.

Further, the master 2 periodically accesses the cloud server 6 and refers to the log entity, the status entity, and the registration entity of each of the terminal devices 4 and 5 in the scheduled task table of the first storage 93 (S11). Based on these references, the master 2 can execute a processing of storing the log information, the status information, and the device information of each of the terminal devices 4 and 5 in the storage unit 15 (S11).

Further, the master 2 can display a list of the registered terminal devices 4 and 5 or display the log information and the status information of the terminal devices 4 and 5 on a screen of the display unit 13 in accordance with an operation signal from a user via the input unit 14 (S11). As described above, the management system 1 can remotely monitor states of the terminal devices 4 and 5 used in a plurality of bases in one base where the master 2 is installed.

According to the management system 1, an instant task that is a non-periodic task other than the scheduled task is executed by the terminal devices 4 and 5 to be requested based on a request from the master 2. The master 2 registers the entity of the instant task (hereinafter, referred to as an "instant task entity") in the first storage 93 so as to request the corresponding terminal devices 4 and 5 to execute the instant task (S13). For example, update of firmware in one or more terminal devices is implemented as one instant task. The instant task corresponds to an example of a first task in the present disclosure.

The master 2 receives an instant task execution request operation from the main administrator in accordance with an operation signal from the main administrator via the input unit 14 (S12). The master 2 generates data indicating an instant task entity in accordance with the execution request operation of the main administrator and transmits the data to the cloud server 6, so that the instant task entity can be registered in the first storage 93 (S13).

The instant task entity is registered in the first storage 93 in a form of, for example, an instant task table shown in FIG. 5B. Similar to the scheduled task table, the instant task table includes a group of entities including properties of a first key, a second key, a request parameter, a response parameter, a notification source, a progress status, and a device ID.

An "instant task" is described as a value of the first key in the instant task entity in the instant task table. The property of the second key has a value of a transaction ID in the instant task entity. The transaction ID is an ID unique to each of instant tasks that are generated at the same time, and is used to distinguish entities of a plurality of instant tasks that are generated at the same time.

The device ID of a terminal device requesting an instance task is described as a value in the property of the device ID in the instant task entity. For example, when an instant task is requested for all of the first type terminal devices 4 that are management relay targets of the client 3, the device IDs of all of the first type terminal devices 4 that are management relay targets are described in the property of the device ID.

The request parameter in the instant task entity includes, as a value, data describing processing content to be executed as an instant task. The processing content is described as, for example, JSON data. That is, the instant task entity requests a terminal device indicated by the device ID described in the property of the device ID to execute the processing content indicated by the value described in the request parameter. The request parameter in the instant task entity corresponds to an example of task request data in the present disclosure.

When a predetermined file is required to execute an instant task, the master 2 stores the file in the second storage 94 (S14). In this case, information (for example, an URL) indicating a storage destination of the file is described in the request parameter. For example, when the instant task is to update firmware in the terminal devices 4 and 5, the master 2 stores an update file necessary for the update of the firmware in the second storage 94 (S14). In this case, for example, the storage destination URL of the update file of the firmware may be described in the request parameter.

The cloud connector of the second type terminal device 5 accesses the first storage 93 of the cloud server 6 in the set polling cycle, and searches for an instant task targeted for the cloud connector of the second type terminal device 5 (S15). That is, the cloud connector determines whether a new entity of an instant task to be executed by the cloud connector is registered in the instant task table (S15).

When the new entity is registered, the cloud connector updates a value of the property of the progress status of a corresponding instant task entity in the instant task table in the first storage 93 from "request" to "in progress", thereby transmitting the reception of the instant task request to the master 2 (S15).

The master 2 in which the instant task entity is registered confirms a status of the instant task corresponding to the instant task entity (S18). Specifically, the master 2 periodically refers to the instant task entity in the instant task table registered in the first storage 93 at, for example, the first cycle (S18). The master 2 can confirm, by the periodic reference, that the request for the instant task is received based on the fact that a value of the property of the progress status is updated.

When the cloud connector of the second type terminal device 5 executes the instant task, the cloud connector of the second type terminal device 5 refers to (acquires) the request parameter of the instant task entity (S15). When a data file necessary for executing the instant task is present in the second storage 94 based on the referred request parameter, the cloud connector downloads the data file from the second storage 94 based on storage destination information (for example, URL) described in the request parameter (S16), and executes the instant task (S15).

When the instant task is completed, the cloud connector of the second type terminal device 5 updates the corresponding instant task entity in the instant task table (S17). Specifically, the value of the property of the progress status is updated from "in progress" to "completed". Further, a processing result of the instant task is written as the response parameter.

Similar to the cloud connector of the second type terminal device 5, the client 3 accesses the first storage 93 of the cloud server 6 at the set polling cycle, and searches for an instant task that is a management relay target (S19). That is, the client 3 determines whether a new entity of an instant task to be executed by the first type terminal device 4 that is the management relay target of the client 3 is registered in the instant task table (S19). Hereinafter, among the first type terminal devices 4 that are management relay targets, each of one or more first type terminal devices 4 set as an execution target of an instant task in the instant task table (that is, one or more first type terminal devices 4 in which the device ID is described in the property of the device ID) is referred to as an "instant task execution target".

When the new instant task entity for the instant task execution target is registered, the client 3 updates a value of the property of the progress status in the instant task entity from "request" to "in progress" (S19). Further, the client 3 refers to (acquires) the request parameter and recognizes processing content to be executed (S19). Furthermore, the client 3 acquires a data file necessary for the execution of the instant task from the second storage 94 as necessary based on the request parameter (S20).

Thereafter, the client 3 instructs the instant task execution target to execute the instant task via the local area network (S21). At this time, the data file necessary for the execution acquired from the second storage 94 is transferred to each instant task execution target (S21). Then, the client 3 acquires an execution result of the instant task from the instant task execution target (S21).

When the execution of the instant task is completed in all of the instant task execution targets, the client 3 updates the instant task entity of the corresponding instant task execution target in the instant task table (S22). Specifically, the value of the property of the progress status is updated from "in progress" to "completed". Further, a processing result of the instant task is written as the response parameter. By the update of the instant task entity, the client 3 notifies the master 2 of an execution progress and a processing result of the instant task in the instant task execution target via the first storage 93 of the cloud server 6 (S22). The processing results written in S17 and S22, the log information, and the status information correspond to examples of terminal data in the present disclosure.

As the status confirmation, the master 2 refers to the instant task entity in the instant task table of the first storage 93, confirms that the instant task is completed by notifying that the value of the property of the progress status is updated to "completed", and writes the processing result into the storage unit 15 (S23).

Further, the master 2 can display the processing result on the screen of the display unit 13. When the master 2 confirms that the registered instant task is completed in all of corresponding instant task execution targets, in other words, that the execution instruction of the instant task is no longer necessary (S24), the master 2 deletes the instant task entity of the instant task that is no longer necessary from the first storage 93 (S25). Further, the data file (for example, the firmware update file) in the second storage 94 provided for the corresponding instant task is deleted (S26).

As described above, the management system 1 can remotely control the terminal devices 4 and 5 used in a plurality of bases in one base where the master 2 is installed by registering and updating the instant task entity in the first storage 93 of the cloud server 6 and further transferring the data file via the second storage 94.

(1-4) Effects of Embodiment

In the management system 1 according to the embodiment described above, the cloud server 6 passively functions relative to the master 2 and the client 3. That is, the cloud server 6 does not actively execute a determination processing or the like to give commands, requests, notifications, or the like to the master 2 or the client 3. Each of the master 2 and the client 3 writes necessary data into the cloud server 6. Each of the master 2 and the client 3 accesses the cloud server 6 and reads data. Therefore, the cloud server 6 can be implemented in a simple and low-cost manner. In other words, the terminal devices 4 and 5 can be managed using the simple and low-cost cloud server 6. Therefore, the terminal devices 4 and 5 can be managed in a simple and low-cost manner.

In addition, the client 3 and the cloud connector access the first storage 93 by periodic pollings, and confirm the presence or absence of an instant task. Then, when an instant task targeted for the client 3 or the cloud connector, the client 3 or the cloud connector executes the instant task. Specifically, the client 3 causes the first type terminal device 4 that is the management relay target to execute a task, and writes a result (for example, log information, status information, and the like) into the first storage 93. The cloud connector causes the second type terminal device 5 on which the cloud connector is mounted to execute a task, and writes a result into the first storage 93. Then, the master 2 accesses the first storage 93 by periodic pollings, and acquires various terminal data such as log information and status information. Therefore, the master 2 can appropriately manage a state of each management target.

Various tables are written into the first storage 93 that is a database, and files are stored in the second storage 94. That is, storages in which information is to be stored are selectively used according to types of the information to be stored. Therefore, the cloud server 6 can be utilized flexibly and efficiently according to the types of information.

In the present embodiment, the main management program 15*a* and the sub-management program 35*a* are both installed by the common installer. Therefore, the main management program 15*a* or the sub-management program 35*a* can be efficiently installed in a computer.

In the present embodiment, the cloud server 6 corresponds to an example of a cloud storage in the present disclosure. The master 2 corresponds to an example of a first communication device in the present disclosure. The client 3 corresponds to an example of a second communication device in the present disclosure. The first type terminal device 4 corresponds to an example of a first terminal device in the present disclosure. The second type terminal device 5 corresponds to an example of a second communication device and a second terminal device in the present disclosure. More specifically, a function of the second type terminal device 5 as a cloud connector that is implemented based on the communication program 82*a* corresponds to an example of a function of the second communication device in the present disclosure. The controller 11 of the master 2 and the controller 31 of the client 3 correspond to an example of a computer in the present disclosure. The main management program 15*a* and the sub-management program 35*a* correspond to an example of a management program in the present disclosure.

Figure 4B:
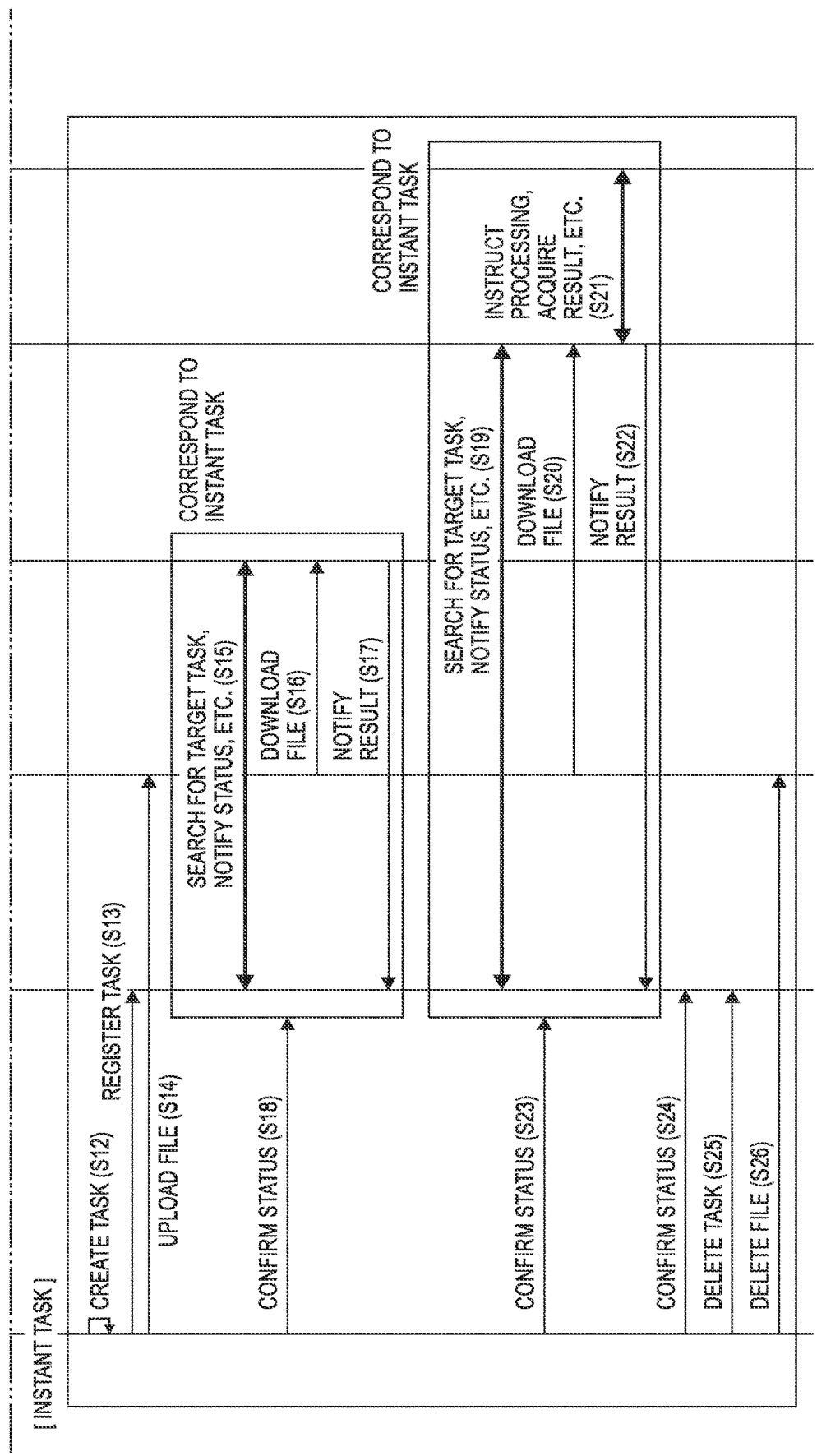

In FIG. 4B, S13 and S14 correspond to an example of a first writing processing in the present disclosure. The processings in S11, S18, and S23 correspond to an example of a first acquisition processing and a first polling in the present disclosure. The processings in S15 and S19 (in particular, the acquisition of the request parameter in the instant task entity) correspond to an example of a second acquisition processing and a second polling in the present disclosure. The processings in S09, S10, S17, and S22 (in particular, writing the processing result of the task) correspond to an example of a second writing processing in the present disclosure. The processing in S02 corresponds to an example of a third writing processing in the present disclosure. The processing in S08 corresponds to an example of a third acquisition processing in the present disclosure. The processing in S04 corresponds to an example of a generation processing in the present disclosure. The processing in S06 corresponds to an example of an import processing in the present disclosure.

Figure 7:
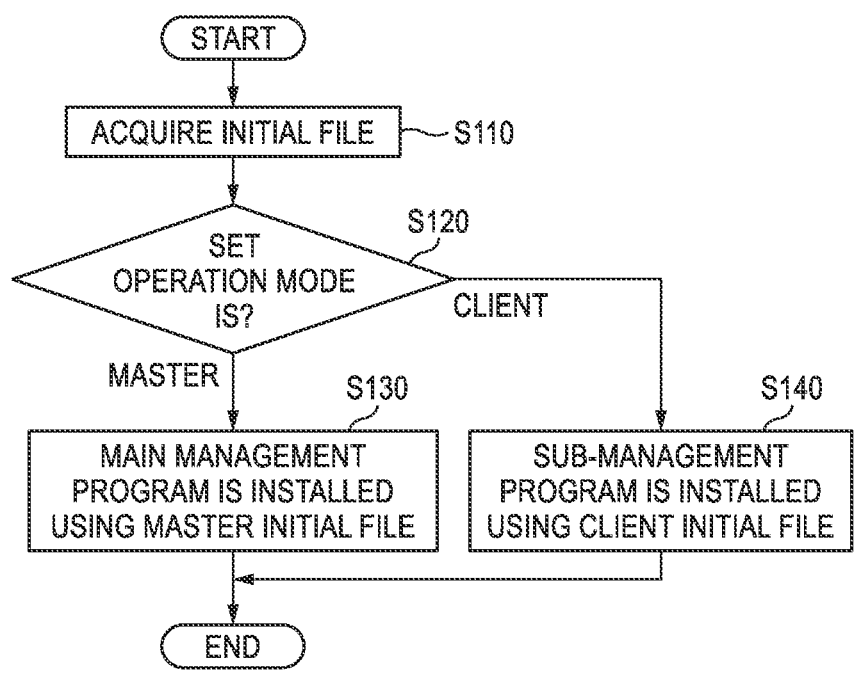
FIG. 7 is a flowchart showing an installation processing.

In FIG. 7, the processing in S110 corresponds to an example of a function information acquisition processing in the present disclosure. The processings in S120 to S140 correspond to an example of an installation processing in the present disclosure.

2. Other Embodiments

Although an embodiment of the present disclosure has been described above, the present disclosure is not limited to the embodiment described above and can be implemented in various modifications.

(2-1) In the instant task table shown in FIG. 5B, the request parameter and the response parameter may be integrated as one common property. That is, when an instant task is instructed from the master 2, the processing content of the instant task may be described in a predetermined task description property, and w % ben the instant task is executed by the client 3, an execution result of the instant task may be overwritten on the same task description property.

(2-2) The first storage 93 is not limited to a NoSQL data store. The first storage 93 may be an SQL database such as a relational database.

(2-3) The second type terminal device 5 may be provided in at least one of the first base and the second base. The third base may be provided with the same network system as the second base, that is, the client 3 and the first type terminal device 4. A plurality of network systems the same as the second base may be present in the management system 1.

(2-4) A plurality of functions of one constituent element in the embodiment described above may be implemented by a plurality of constituent elements, or one function of one constituent element may be implemented by a plurality of constituent elements. A plurality of functions of a plurality of components may be implemented by one constituent element, or one function to be implemented by a plurality of constituent elements may be implemented by one constituent element. A part of the configurations in the embodiment described above may be omitted.

What is claimed is:

1. A management system comprising:
a first communication device configured to access a cloud storage; and
a second communication device that is configured to access the cloud storage and is communicably connected to a first terminal device or provided in a second terminal device,
wherein the first communication device is configured to execute
a first writing processing of writing task request data into the cloud storage, the task request data being data for requesting a management target to execute a first task and the management target being the first terminal device connected to the second communication device or the second terminal device provided with the second communication device,
a first acquisition processing of acquiring terminal data from the cloud storage in response to arrival of a first acquisition timing, the terminal data being data included in the management target, acquired from the management target by the second communication device, and written into the cloud storage, and
the second communication device is configured to execute
a second acquisition processing of acquiring the task request data from the cloud storage and executing the first task for the management target based on the task request data in response to arrival of a second acquisition timing, and
a second writing processing of acquiring the terminal data from the management target and write the terminal data into the cloud storage,
the first communication device is configured to further execute a generation processing of generating a profile including data for the second communication device to access the cloud storage,
the generation processing comprises setting, as at least a part of the profile, a shared access signature set in the cloud storage,
the second communication device further executes an import processing of importing the profile generated in the generation processing, and
the second communication device is configured to be accessible to the cloud storage in response to the importing of the profile in the import processing.

2. The management system according to claim 1,
wherein the first acquisition processing includes executing a first polling for the purpose of acquiring the terminal data from the cloud storage.

3. The management system according to claim 1,
wherein the second acquisition processing includes executing a second polling for the purpose of acquiring the task request data from the cloud storage.

4. The management system according to claim 1,
wherein the second writing processing includes a second task of periodically and repeatedly acquiring the terminal data of a designated type and writing the terminal data into the cloud storage.

5. The management system according to claim 4,
wherein the first communication device further executes a third writing processing of writing designation information for designating the type of the terminal data to be acquired in the second task into a first storage area of the cloud storage,
the second communication device further executes a third acquisition processing of acquiring the designation information from the cloud storage, and
the second task is to periodically and repeatedly acquire the terminal data of the type designated by the designation information acquired in the third acquisition processing, and to write the acquired terminal data into a second storage area different from the first storage area in the cloud storage.

6. The management system according to claim 1,
wherein the second writing processing includes acquiring data indicating an execution result of the first task from the management target as the terminal data and writing the acquired data into the cloud storage.

7. The management system according to claim 1,
wherein the cloud storage includes the first storage and the second storage,
the first storage is configured so that a database is written thereinto,
the second storage is configured to store a file, and
the task request data and the terminal data are written into the first storage.

8. The management system according to claim 5,
wherein the cloud storage includes the first storage and the second storage,
the first storage is configured so that a database is written thereinto,
the second storage is configured to store a file, and
the designation information is written into the first storage area in the first storage.

9. The management system according to claim 7,
wherein the first writing processing includes writing the file used in the first task into the second storage, and
the first task includes downloading the file from the second storage to the management target.

10. The management system according to claim 1, wherein the second acquisition timing is periodic.

11. The management system according to claim 1, wherein the generation processing further comprises setting a cloud parameter comprising an initial setting parameter.

12. A non-transitory computer readable medium storing an installation program for installing a program in a computer, the program being used for causing the computer to function as a first communication device or a second communication device,
wherein the first communication device is configured to execute
a first writing processing of writing task request data into a cloud storage, the task request data being data for requesting a terminal device configured to communicate with the second communication device to execute a task, and
a first acquisition processing of acquiring terminal data from the cloud storage in response to arrival of a first acquisition timing, the terminal data being data included in the terminal device acquired from the terminal device by the second communication device, and written into the cloud storage,
the second communication device is configured to execute
a second acquisition processing of acquiring the task request data from the cloud storage and executing the first task for the management target based on the task request data in response to arrival of a second acquisition timing, and
a second writing processing of acquiring the terminal data from the terminal device and writing the acquired terminal data into the cloud storage,
the installation program causes the computer to execute processes including:
acquiring function information indicating that the computer is to function as the first communication device or the second communication device; and
installing, in the computer, the program for causing the computer to function as the first communication device or the second communication device indicated by the function information acquired in the acquiring,
the first communication device is configured to further execute a generation processing of generating a profile including data for the second communication device to access the cloud storage,
the generation processing comprises setting, as at least a part of the profile, a shared access signature set in the cloud storage,
the second communication device further executes an import processing of importing the profile generated in the generation processing, and
the second communication device is configured to be accessible to the cloud storage in response to the importing of the profile in the import processing.

13. A management method for managing a management target by a first communication device configured to access a cloud storage, via a second communication device configured to access the cloud storage,
wherein the second communication device is communicably connected to a first terminal device or is provided in a second terminal device, and
the management target is the first terminal device connected to the second communication device or the second terminal device provided with the second communication device,
the management method comprising:
generating a profile by the first communication device, the profile including data for the second communication device to access the cloud storage, wherein the generating the profile comprises setting, as at least a part of the profile, a shared access signature set in the cloud storage;
importing the profile to the second communication device;

configuring the second communication device to be accessible to the cloud storage in response to the importing of the profile;

writing task request data that is data for requesting the management target to execute a first task into the cloud storage by the first communication device;

acquiring terminal data from the cloud storage in response to arrival of a first acquisition timing by the first communication device, the terminal data being data included in the management target, acquired from the management target by the second communication device, and written into the cloud storage;

acquiring the task request data from the cloud storage and executing the first task for the management target based on the task request data in response to arrival of a second acquisition timing by the second communication device; and acquiring the terminal data from the management target and writing the acquired terminal data into the cloud storage by the second communication device.

* * * * *